United States Patent [19]

Kopiec et al.

[11] Patent Number: 4,897,907
[45] Date of Patent: Feb. 6, 1990

[54] PROCESS FOR MANUFACTURING NOZZLE TIP

[75] Inventors: Lawrence J. Kopiec, Unionville; Franklin S. Smith, Newington, both of Conn.

[73] Assignee: Stanadyne Automotive Corp., Windsor, Conn.

[21] Appl. No.: 331,437

[22] Filed: Mar. 31, 1989

[51] Int. Cl.⁴ .............................................. B21D 53/06
[52] U.S. Cl. .................................... 29/888.4; 29/557; 29/558; 29/890.142; 72/340; 239/533.9
[58] Field of Search .......... 29/157 R, 157 C, 157.1 R, 29/157.1 A, 157.6, 557, 558; 72/107, 108, 340; 239/533.3, 533.9, 585

[56] References Cited

U.S. PATENT DOCUMENTS

| | | | |
|---|---|---|---|
| 1,845,122 | 2/1932 | Briney | 72/340 |
| 1,949,515 | 3/1934 | Norton | 29/558 |
| 2,103,839 | 12/1937 | Bardell | 72/107 |
| 2,122,481 | 7/1938 | Lynch | 72/340 |
| 2,930,115 | 3/1960 | Dietzsch, Sr. et al. | 29/157 C X |
| 3,780,410 | 12/1973 | Drake | 72/107 X |
| 3,959,863 | 6/1976 | Bruce | 72/340 X |
| 4,069,978 | 1/1978 | El moussa | 29/157 C X |
| 4,502,196 | 3/1985 | Kupper et al. | 29/157 C |
| 4,564,145 | 1/1986 | Takada et al. | 239/533.3 X |
| 4,819,871 | 4/1989 | Kronberger et al. | 29/157 C X |

Primary Examiner—Timothy V. Eley
Assistant Examiner—Frances Chin
Attorney, Agent, or Firm—Chilton, Alix & Van Kirk

[57] ABSTRACT

A process for manufacturing a nozzle tip of an elongated valve closing orifice type comprises rolling a tubular workpiece so as to form a circumferential indentation in said workpiece. The interior surface of the indented wall is precisely ground to form an integral collar which functions as guide surface for the valve member.

10 Claims, 5 Drawing Sheets

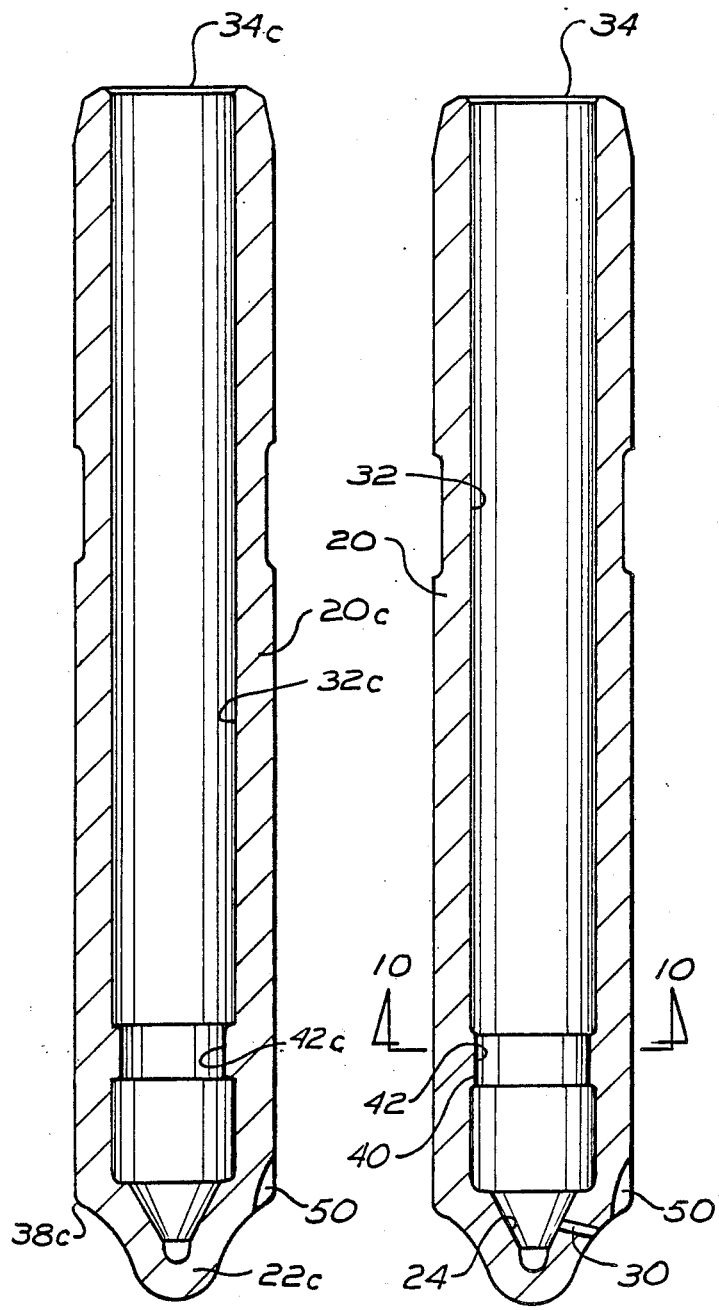
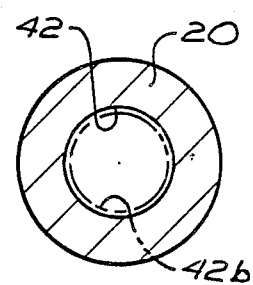
FIG. 8    FIG. 9    FIG. 10

PROCESS FOR MANUFACTURING NOZZLE TIP

BACKGROUND OF THE INVENTION

This invention relates generally to manufacturing processes for constructing injection nozzles. More particularly, this invention relates to processes for manufacturing elongated nozzle body tips of fuel injectors such as may be employed in internal combustion engines.

In fuel injection nozzles of the valve closing orifice type to which the present invention has particular applicability, the nozzle body has an elongated narrow form which terminates in an elongated tip having a reduced diameter. The tip is a separate component which is inserted into the end of the nozzle body. A shouldered compression ring seals between the tip and the nozzle body to seal and insulate the nozzle body from combustion pressure, hot combustion gases, and combustion products. An elongated reciprocating valve is disposed in the nozzle body. The valve includes a valve surface which seals against a conical seat formed at the interior end of the tip. Injection spray orifices are formed in the nozzle tip to provide fluid communication from the nozzle for injection of fuel or other applications.

Because of the elongated characteristics of the valve and the pressures exerted on the valve, an integral collar defining a cylindrical lower guide surface may be formed at the nozzle tip interior to prevent bowing of the valve and eccentric valve operation. The lower guide surface must be finished within precise tolerances in order to achieve proper valve operation. Because the nozzle tip guide surface has an inside diameter which is less than the inside diameter of the nozzle tip bore for most of the longitudinal extent of the nozzle tip body, manufacturing the internal guide surface can be problematical and costly.

Lower guide surfaces are also advantageous in pintle-type injectors which employ an elongated axially displaceable valve. The injection opening of the nozzle opens generally axially through the end of the nozzle body.

In conventional manufacturing processes to which the invention relates, a nozzle tip blank is initially formed from cold rolled steel. The internal conical seat, the valve tip bore and the lower guide surface are precisely ground to form the finished surfaces. The nozzle tip has enlarged bore portions disposed between the guide surface and the valve seat formed at the interior distal tip as well as enlarged bore portions disposed between the proximal end of the nozzle tip and the guide surface. Consequently, the grinding and finishing steps of the nozzle tip body requires precise longitudinal and radial positioning of the guide surface and precise dimensioning of the guide surface.

SUMMARY OF THE INVENTION

Briefly stated, the invention in a preferred form is a new and improved process for manufacturing an elongated nozzle tip employed in connection with fuel injectors such as the valve closing orifice type or other types having elongated reciprocating valve members. The manufacturing process comprises exteriorly forming a circumferentially extending indentation in a tubular workpiece between the distal end and the proximal end of the workpiece. The indentation forms a corresponding indented wall of substantially uniform thickness defining an interior surface having a reduced inside diameter. The interior surface is then ground to remove material to form an integral collar defining a generally cylindrical guide surface having a substantially uniform diameter which is less than the enlarged diameter of the non-indented portions of the nozzle tip bore.

The manufacturing process may result in an increase in the axial length of the workpiece. The workpiece may be ground to remove material from the proximal end of the workpiece to achieve the proper longitudinal dimensions. The exterior surface of the workpiece may also be smoothed to form a continuously cylindrical exterior surface which extends longitudinally beyond the opposing ends of the guide surface. The process preferably comprises precisely locating the workpiece on a rolling machine mandrel and applying a rotating engagement force to the exterior surface of the workpiece. The interior distal end portion of the workpiece is then ground to form a conical seat. The spray orifices are also formed in the tapered distal end portion of the workpiece.

An object of the invention is to provide a new and improved process for manufacturing an elongated injection nozzle tip.

Another object of the invention is to provide new and improved manufacturing process wherein an integral collar defining interior guide surface for a nozzle tip may be formed in an efficient and cost effective manner.

A further object of the invention is to provide a new and improved process for manufacturing an injector nozzle tip featuring a precisely located and precisely dimensioned valve guide surface.

Other objects and advantages of the invention will become apparent from the drawings and the specification.

BRIEF DESCRIPTION OF THE DRAWINGS

FIG. 8 is an axial sectional view illustrating a semi-finished nozzle tip of the manufacturing process;

FIG. 9 is an axial sectional view illustrating a finished nozzle tip configuration in accordance with the manufacturing process;

FIG. 10 is a cross-sectional view, partly in phantom, of the nozzle tip of FIG. 9 taken along the line 10—10 thereof.

DETAILED DESCRIPTION OF THE INVENTION

Figure 1:
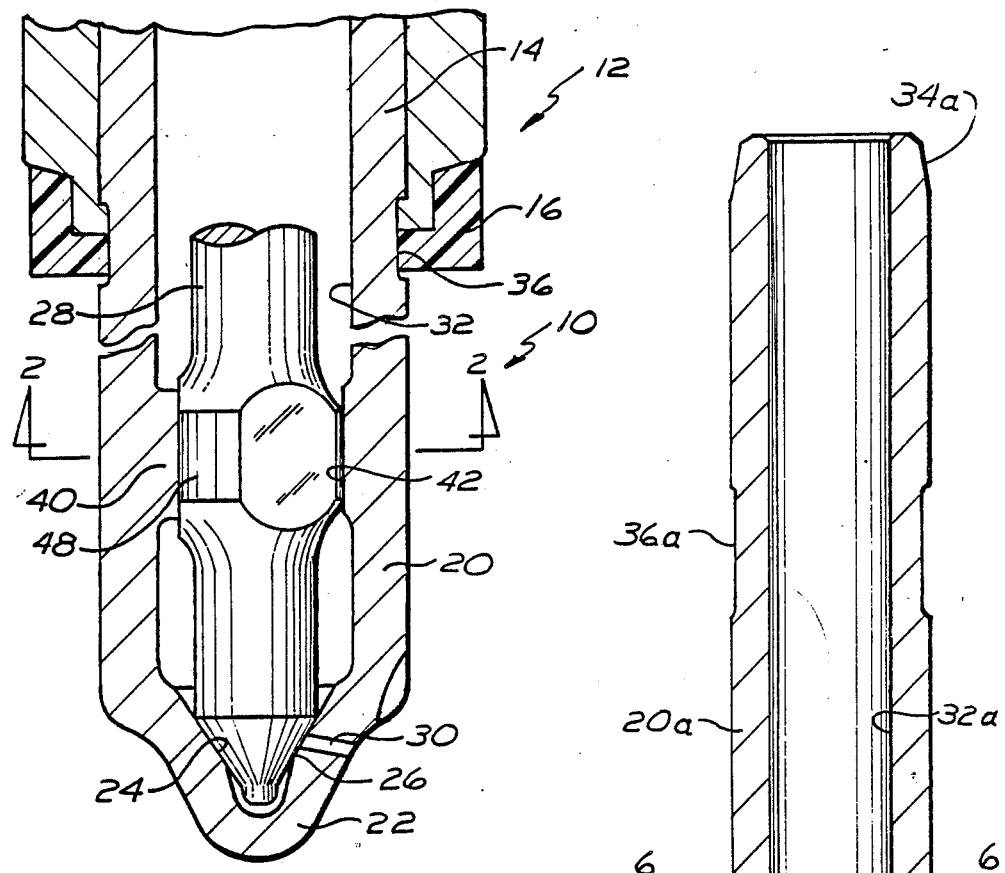
FIG. 1 is an enlarged fragmentary sectional view, illustrating an injector nozzle, to which the manufacturing process of the present invention has applicability.
Figure 2:
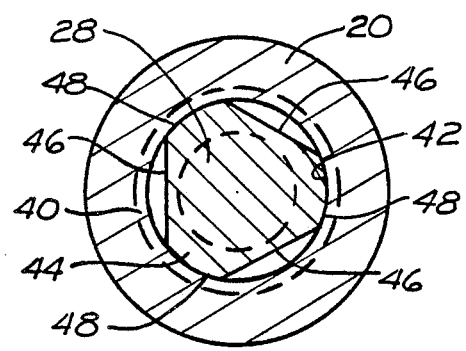
FIG. 2 is a cross-sectional view, partly in phantom, of the nozzle tip of FIG. 1 taken along the line 2—2 thereof.

With reference to the drawings wherein like numerals represent like parts throughout the figures, the manufacturing process of the present invention is preferably directed to a process for manufacturing elongated nozzle tips 10 for nozzle injectors of the valve closing orifice type such as generally designated by the numeral 12 in FIG. 1. Injector nozzle 12 is adapted for injection of fuel into the cylinder of an internal combustion engine. The invention is also applicable to pintle-type injectors or other types of injectors and nozzles.

The nozzle tip 10 has a reduced diameter in comparison to the diameter of the nozzle body 14. The nozzle tip 10 is inserted axially into the end of the nozzle body 14. A compression seal 16 seals between the nozzle tip 10 and the nozzle body to seal and insulate the nozzle body from the combustion pressure, the hot combustion gases, and the products of combustion. The elongated tip 10, which may extend on the order of 19 mm beyond the primary nozzle body in some installations, has proved advantageous in reducing the transfer of heat to the nozzle body 14 when compared to standard nozzle tips which typically have a longitudinal dimension of approximately 5.4 mm.

The nozzle tip 10 comprises an elongated narrow nozzle tip body 20 terminating in a nose or tapered distal end 22. A conical seat 24 is precisely formed at the nozzle tip body interior for engaging a complementary valve surface 26 of an elongated valve member 28. A recessed cylindrical exterior sealing surface 36 is dimensioned and positioned to receive compression seal 16. Pressurized fuel enters the nozzle bore 32 through the proximal end 34. Angularly spaced orifices 30 which are disposed at the distal portion of the nozzle tip provide restricted outlets for injecting a conical spray of pressurized fuel. The valve member lifts from the seat to allow the momentary injection of pressurized fuel through the orifices 30. The specific mechanism by which the valve is forced to lift from sealing engagement and the specific configuration of the valve member and orifices are not critical to the invention.

For injector nozzle configurations wherein the valve member is relatively thin and extends a significant axial distance in the nozzle body, it is advantageous to employ an integral inwardly projecting collar 40 defining a guide surface or guide sleeve 42 at the interior of the nozzle tip. The cylindrical guide surface 42 is conventionally machined at the nozzle tip interior in a process which is labor intensive and time consuming in relation to the overall manufacturing process. The integral guide collar 40 projects radially inwardly to form the surface 42 which has a reduced inside diameter in comparison to the generally uniform diameter of the longitudinal portion of the nozzle body bore 32. The valve member includes a guide platform 44 having angularly spaced flats 46 interposed between peripheral rounded guides 48 which are complementary with the contour of the cylindrical guide surface 42. Throughout the axial reciprocal motion of the valve member, the rounded surfaces 48 of the guide platform continuously slidably engage the guide surface 42. The guide surface and the guide platform cooperate to inhibit eccentric motion of the valve member and prevent bowing of the elongated valve member.

Figure 3:
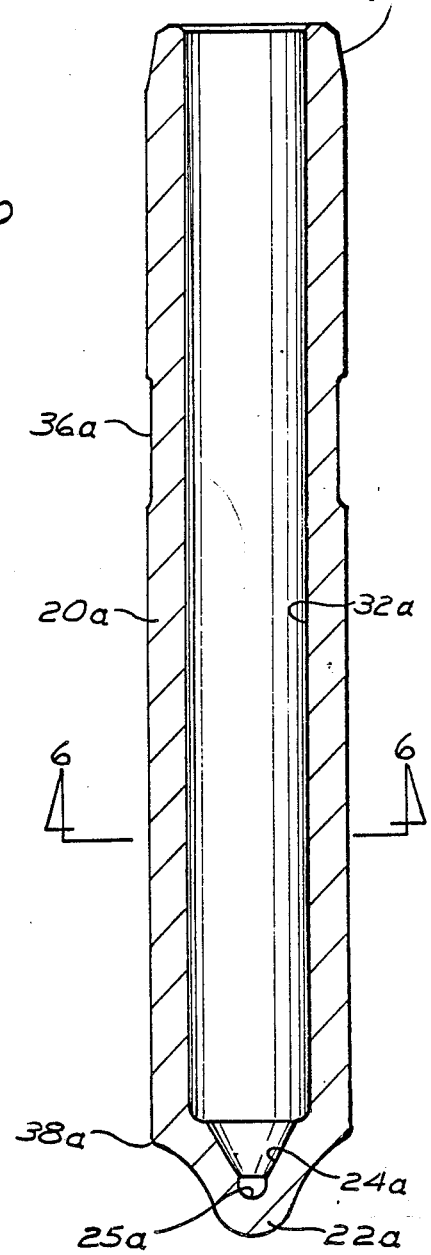
FIG. 3 is an axial sectional view of a nozzle tip blank employed in the manufacturing process of the present invention.

The process for manufacturing the nozzle tip can best be appreciated by reference to the progressive stages in the formation of the nozzle tip 10 as illustrated in FIGS. 3–10. The letters a, b, and c represent progressive stages in the formation of a nozzle tip structure designated by a corresponding numeral. With reference to FIG. 3, a nozzle tip blank 20a formed from cold rolled steel has a generally tubular form. The nozzle tip blank 20a terminates in a tapered distal end 22a. The tip blank 20a has walls of a substantially uniform thickness excepting for a recessed cylindrical sealing surface 36a and a tapered surface at the proximal end 34a. The nozzle bore 32a has a substantially uniform diameter. A nozzle distal end 22a interiorly forms a generally conically shaped surface 24a and a small sac 25a at the nozzle body interior. Surface 24a constitutes a rough unfinished valve seat. A transition shoulder 38a defines an exterior surface transition from a generally cylindrical surface to the contoured tapered distal end 22a. It should be appreciated that nozzle tip blank 20a may require a series of manufacturing steps which are conventional and need not be further described for purposes of the present invention.

Figure 4:
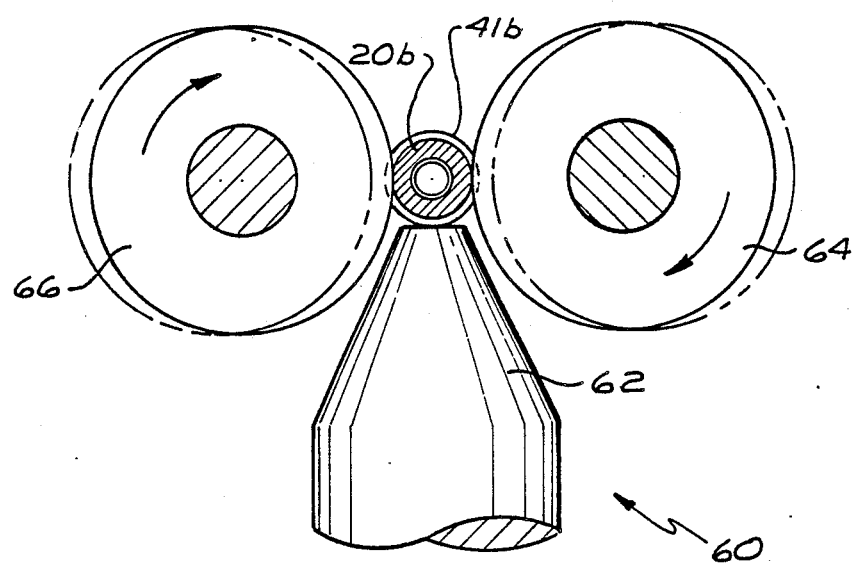
FIG. 4 is a cross-sectional view, partly in schematic and partly in phantom of the nozzle tip and a roller assembly illustrating a step of the manufacturing process.

The nozzle tip blank 20a is transferred to a rolling machine designated generally with the numeral 60 in FIG. 4. The nozzle body blank is placed on a mandrel blade 62 and is preferably axially located using the transition shoulder 38a or the distal tip 22a as the reference position. The nozzle tip blank 20a is interposed between an idler roller 64 and a drive roller 66. The rollers 64 and 66 are dimensioned and diametrically positioned for precise engagement against the tubular nozzle blank at the exterior location outwardly opposite the interior guide sleeve to be formed in the nozzle body.

Figure 5:
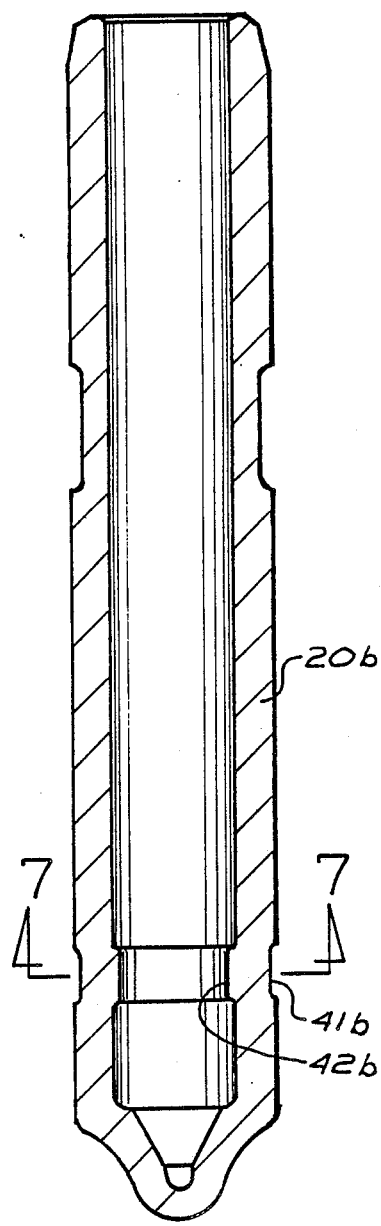
FIG. 5 is an axial sectional view illustrating the nozzle tip configuration after completion of the manufacturing process step illustrated in FIG. 4.
Figure 6:
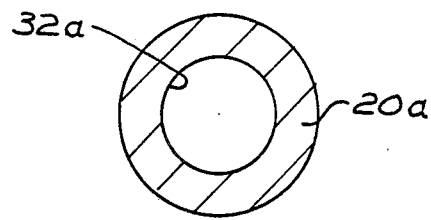
FIG. 6 is a cross-sectional view of the nozzle tip blank taken along the line 6—6 of FIG. 3.
Figure 7:
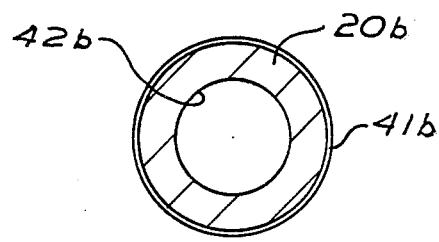
FIG. 7 is a cross-sectional view of the nozzle tip of FIG. 5 taken along the line 7—7 thereof.

The rotating drive roller and the rotatable idler roller are forced into engagement with the nozzle tip blank workpiece to thereby form a nozzle tip blank 20b having a circumferential annular indentation 41b as best illustrated in FIGS. 5 and 7. Upon engagement, the blank 20a workpiece rotates, and an annular grove having a generally uniform radial depth and axial length is formed.

Rolling machine 60 may be any of a number of various types and models. One suitable rolling machine that may be employed in the manufacturing process is a MC-10-F Kine-Roller rolling machine manufactured by Kinefac Corporation of Worcester, Mass.

The described rolling process produces a resultant indentation surface 42b at the nozzle interior. The cylindrical annular indentation wall is found to have a substantially uniform thickness which is approximately equal to the thickness of the nozzle body. An approximately one-to-one correspondence between the displacement of the interior and exterior indentation surfaces 41b, 42b may be achieved. In addition, there is a high degree of concentricity of the interior surface to the exterior surface. The rolling process is a material displacement process which results in a slight increase in the axial length of the nozzle body. This slight elongation can be viewed as a slight extension of the proximal end portion of the nozzle body although there may also be a very slight axial increase in the distal end portion.

The nozzle tip workpiece 20b is then transferred to a grinder (not illustrated) where the exterior surface of the body is smoothed to a continuous cylindrical surface to essentially remove the indentation 41b and form a semi-finished nozzle body blank 20c as illustrated in FIG. 8. A notch 50 is also cut into the nozzle body at the transition 38c between the cylindrical body and the tapered distal end 22c of the nozzle workpiece. The nozzle orifices 30 are also tapped into the nozzle body.

The nozzle body 20c is transferred to a high temperature furnace for heat treatment the heat treatment hardens the nozzle body to enhance the wear resistance.

Figure 11:
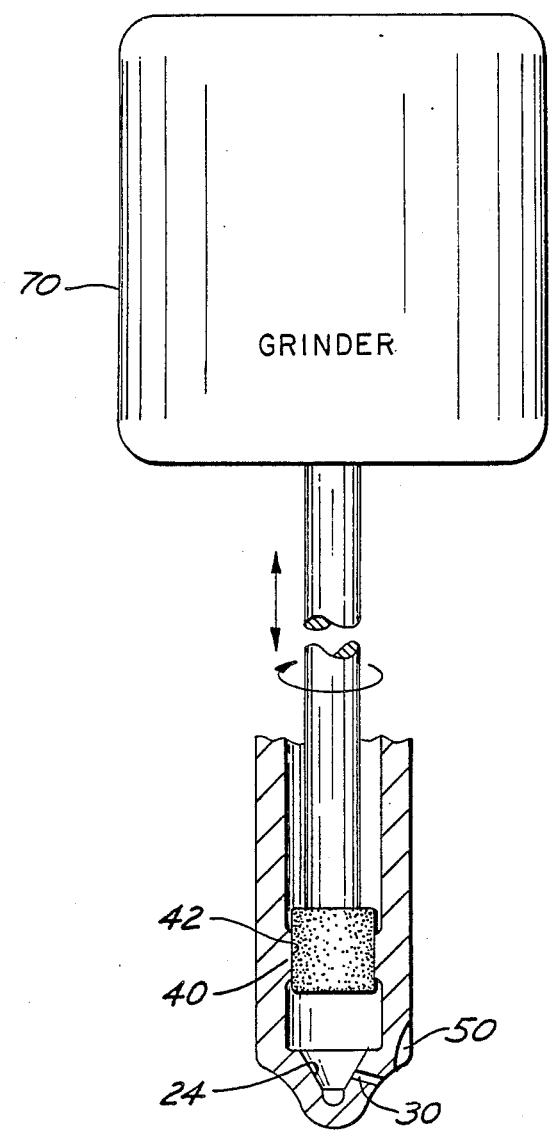
FIG. 11 is a schematic view of a grinder and a portion of a nozzle tip illustrating a step in the manufacturing process of the present invention.

The nozzle body 20c is then transferred to a grinder 70 such as schematically illustrated in FIG. 11 and preferably located by using the transition shoulder 38c or the distal nose end 22c as a reference position. The body 20c is preferably clamped into position with a double diaphragm clamp engaging axially spaced locations between the unfinished guide surface 42c and the proximal end 34c. The conical seat 24 and the guide surface 42 are precisely ground to the finished configurations. The wall of the nozzle bore 32c is also ground to the finished bore dimensions.

A suitable grinder 70 for finishing the seat, guide surface and nozzle bore is a U80 precision grinding system manufactured by UVA ab of Bromma, Sweden.

EXAMPLE

In one embodiment, the nozzle tip blank 20a has a length of approximately 1.34 inches, an outside 0.22 inches, a bore 32a diameter of approximately 0.12 inches and a wall thickness of approximately 0.05 inches. The finished guide surface 40 has a diameter of approximately 0.11 inches and a longitudinal dimension of approximately 0.08 inches. The thickness of the material removed from surface 42c to obtain the finished guide surface 40 is approximately 0.003 inches.

It should be appreciated that the foregoing described manufacturing process provides a very efficient means wherein the nozzle tip body 10 for an injector of a type which requires an integral lower cylindrical guide may be manufactured in a very efficient and cost effective manner. The formation of the guide collar 40 and the guide surface 42 from the blank 20a may be accomplished in a few seconds as opposed to conventional machining processes which ordinarily require at least a few minutes. In addition, the integral guide surface is formed with a high degree of roundness and concentricity relative to the tip body.

While a preferred embodiment of the foregoing invention has been set forth for purpose of illustration, the foregoing description should not be deemed a limitation of the invention herein. Accordingly, various modifications, adaptations, and alternatives may occur to one skilled in the art without departing from the spirit and the scope of the present invention.

What is claimed is:

1. A process for manufacturing a nozzle tip from a tubular workpiece defining an axial bore and having a distal end and an open proximal end and an exterior surface comprising:
   (a) exteriorly forming a circumferentially extending indentation in said workpiece between said distal end and said proximal end to form a corresponding indented wall of substantially uniform thickness defining an interior surface having a reduced inside diameter; and
   (b) removing material from said indented wall to form an integral collar defining a generally cylindrical guide surface having a substantially uniform diameter which is less than the diameter of non-indented portions of the axial bore.

2. The manufacturing process of claim 1 wherein the workpiece has an axial length and step (a) further results in an increase in the axial length of the workpiece and further comprising:
   (c) removing material from the proximal end of said workpiece.

3. The manufacturing process of claim 1 further comprising the step of:
   (d) removing material from the exterior surface of said workpiece to thereby form a continuously cylindrical exterior surface which extends axially beyond opposing ends of said collar.

4. The manufacturing process of claim 1 wherein step (a) further comprises rolling said workpiece by applying a rotating engagement force to the exterior surface of the workpiece.

5. The manufacturing process of claim 1 wherein said workpiece has an interior distal end portion and further comprising the step of:
   (e) grinding the interior distal end portion of said workpiece so as to form a conical seat after step (a) is completed.

6. The manufacturing process of claim 1 further comprising the step of:
   (f) forming at least one orifice in the distal end workpiece after step (a) is completed.

7. A process for manufacturing a nozzle tip from a tubular workpiece defining an axial bore and having a distal end and an open proximal end and an exterior surface comprising:
   (a) locating said workpiece on a mandrel of a rolling machine by positioning said workpiece with reference to a pre-established workpiece reference position;
   (b) rolling said workpiece so as to form a crcumferentially extending indentation in said workpiece between said distal end and said proximal end thereby forming a corresponding indented wall of substantially uniform thickness defining an interior surface having a reduced inside diameter; and
   (c) grinding the interior surface to form a generally smooth cylindrical guide surface having a substantially uniform diameter which is less than the diameter of non-indented portions of the bore.

8. The manufacturing process of claim 7 further comprising the step of:
   (d) grinding the proximal end portion of said workpiece to obtain a dimensioned workpiece having a pre-established axial dimension.

9. The manufacturing process of claim 8 further comprising the step of:
   (e) grinding the exterior surface of said workpiece to form a generally continuous cylindrical surface which extends axially beyond opposing ends of said interiorly formed guide surface.

10. The manufacturing process of claim 7 wherein said nozzle has a tapered distal end portion defining a transition with the tubular workpiece and said workpiece reference position is located at said transition.

* * * * *